United States Patent [19]

Garziera et al.

[11] 4,142,244

[45] Feb. 27, 1979

[54] PROGRAMMABLE ELECTRONIC COMPUTER

[75] Inventors: Gastone Garziera, Ivrea (Turin); Federico Pisani, Scarmagno, (Turin) both of Italy

[73] Assignee: Ing. C. Olivetti & C., S.p.A., Ivrea (Turin), Italy

[21] Appl. No.: 784,424

[22] Filed: Apr. 4, 1977

[30] Foreign Application Priority Data

Apr. 15, 1976 [IT] Italy .............................. 67898 A/76

[51] Int. Cl.² .......................... G06F 3/02; G06F 3/14
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,855,461 | 12/1974 | Stockwell | 364/200 |
| 3,962,700 | 6/1976 | Criscimagna | 340/324 M |
| 3,973,244 | 8/1976 | Lovercheck et al. | 364/200 |
| 4,024,531 | 5/1977 | Ashby | 340/324 M |

*Primary Examiner*—Harvey E. Springborn
*Attorney, Agent, or Firm*—Schuyler, Birch, Swindler, McKie & Beckett

[57] ABSTRACT

In a computer, a display is controlled by a dedicated asynchronous control unit and can be selectively connected either to a program buffer or to a keyboard buffer. A special key is operable for alternately switching the display from one to another of the two possible connections. The display has a capacity of a number of characters less than that of the buffers. Service keys are provided for controlling the progressive or selective displaying of all the characters in a buffer.

7 Claims, 13 Drawing Figures

PROGRAMMABLE ELECTRONIC COMPUTER

BACKGROUND OF THE INVENTION

The present invention relates to a programmable electronic computer of the type having a visual display unit which is employed to facilitate communications between the computer and the user.

Computers are known in which, immediately after the introduction of the information to be processed, it can be communicated to the user on the visual display unit, so that it can be checked and corrected. Moreover, the contents of a working memory can be called on to the visual display unit and then modified at discretion, or the recurrence of particular situations in the program, the machine or the operations to be performed can be made clear on the visual display unit for the intervention of the operator.

In these computers it is not generally possible, during the execution of a program, to display visually the characters introduced on the keyboard. In fact, the time of control of the visual display unit by the central unit of the computer is lost for the purposes of processing operations in the course of a program and is so much the greater the more characters the visual display comprises. Therefore, the control of the visual display unit during the execution of a program slows down the execution itself, whereby the valuable speed characteristics of the central unit become ineffective.

SUMMARY OF THE INVENTION

According to the present invention a programmable electronic computer comprises a working memory; a central unit adapted to execute programs recorded in the working memory; a first timing circuit for timing the processing operation of the central unit and execution of programs; a keyboard for introducing information to be processed into an input zone of the working memory; a visual display unit for displaying messages sent by the central unit to a message zone of the working memory; a display control unit comprising a supply memory controlled by said central unit to supply the information to be displayed to the visual display unit, a second timing circuit for timing the control unit and controlling said supply memory independently of the timing of the central unit; signalling means in the central unit for signalling the presence in said message zone of a message sent by the central unit to be displayed; switching means conditionable for selectively connecting the supply memory to the input zone or to said message zone of the working memory; and, manual means, on said keyboard, being operable to condition said switching means whereby said visual display unit can selectively display said message or the keyboard information during the processing operation of the central unit.

BRIEF DESCRIPTION OF THE DRAWINGS

The invention will be described in more detail, by way of example, with reference to the accompanying drawings, wherein.

DESCRIPTION OF THE PREFERRED EMBODIMENT

Figure 1:
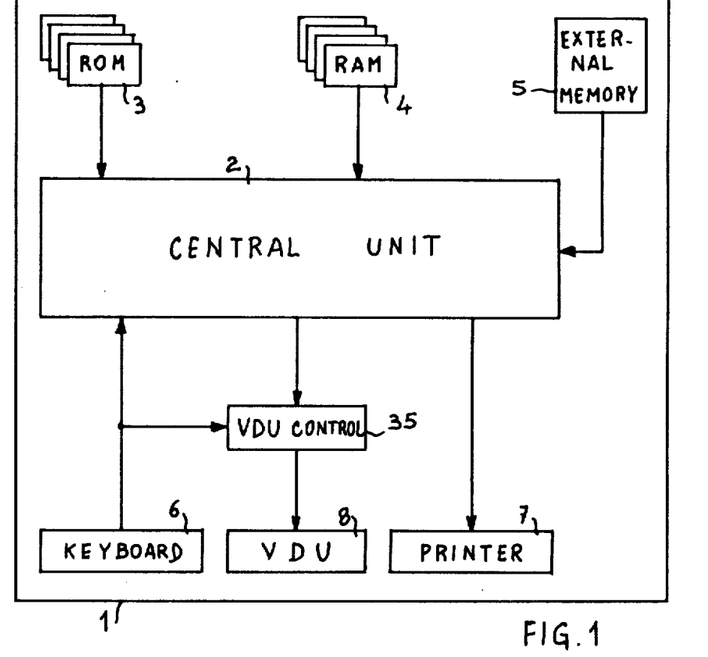
FIG. 1 is a basic block diagram of an electronic computer embodying the invention.

Referring to FIG. 1, the computer 1 is provided with a central unit 2, a series of read-only memories (ROMs) 3 and a series of read/write memories (RAMs) 4.

Moreover, the computer 1 comprises an external flexible-disc memory 5 for user programs or files, a keyboard 6 for the input of user information, and a printer 7 for the output of information from the central unit. Finally, the computer 1 comprises a visual display unit (VDU) 8 for facilitating communications between the computer and the user. The VDU is controlled by a control unit 35.

The central unit 2 (FIG. 4) comprises a timing circuit 9 and a scratch pad memory 10 with a total of 256 bits arranged in sixteen registers L0 to L15, each of two bytes, or in sixteen pairs of registers A0 to A15 and B0 to B15, respectively, each of one byte. Some of these registers perform the function of addresses of the user program in the RAMs 4 or addressers of microprograms in the ROMs 3. Other registers serve to accommodate temporarily data to be processed or intermediate results of computations. The central unit 2 moreover comprises a microinstruction register 11 connected to the ROMs 3, from which it receives the individual microinstructions of a microprogram.

Figure 4:
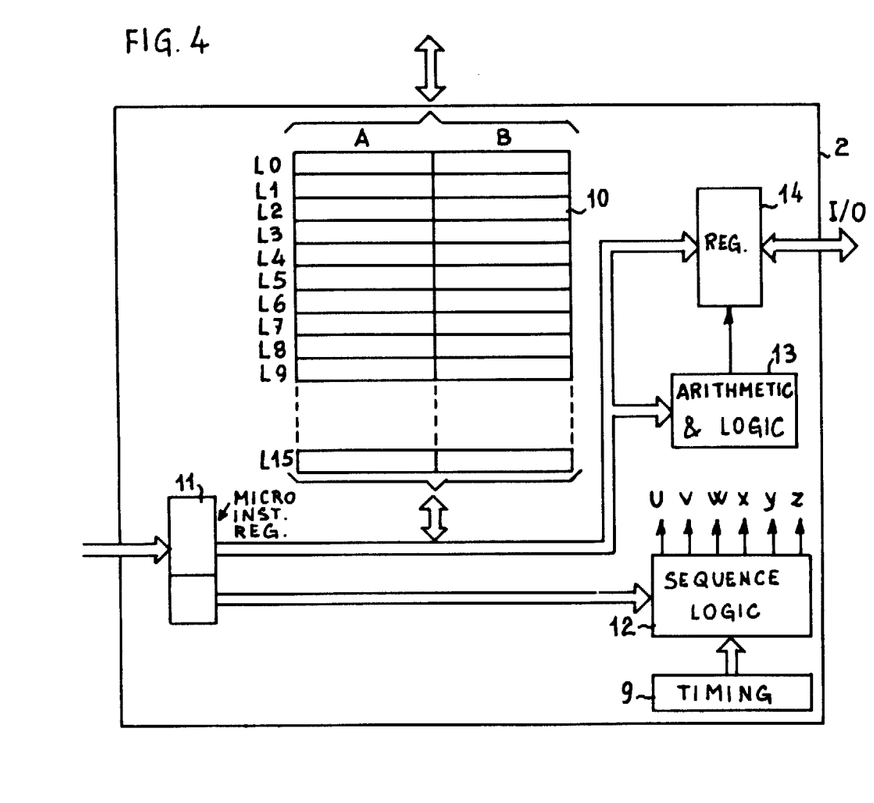
FIG. 4 is a diagram of the central unit of the computer.

The function code of each microinstruction is sent to a sequence logic network 12 which, suitably timed by the circuit 9, sends a corresponding series of enabling signals. More particularly, the signal U of the network 12 serves to enable the addressing of the memory 10, the signals V and W serve to enable an arithmetic and logic unit 13. The unit 13 can be connected to the memory 10 to receive the data to be processed and to send the intermediate results thereto, respectively.

The data or intermediate results can be sent from the unit 13 via a register 14 connected thereto and under the control of a signal X to the printer 7, under the control of a signal Y to the visual display 8 and under the control of a signal Z to the memory 5.

The ROMs 3 are intended to accommodate both application programs and service programs. The RAMs 4 are intended for user data and instructions.

Each memory RAM 4 is divided into blocks and pages for addressing purposes. The first of the 32 pages of the memory RAM 4 indicated by the reference 30 in FIG. 2 constitutes an area, called the Reserved Memory Zone, with automatic addressing and not accessible to the user, for containing constants, machine mode masks, buffers for peripherals connected to the computer 1, and so on.

Figure 2:
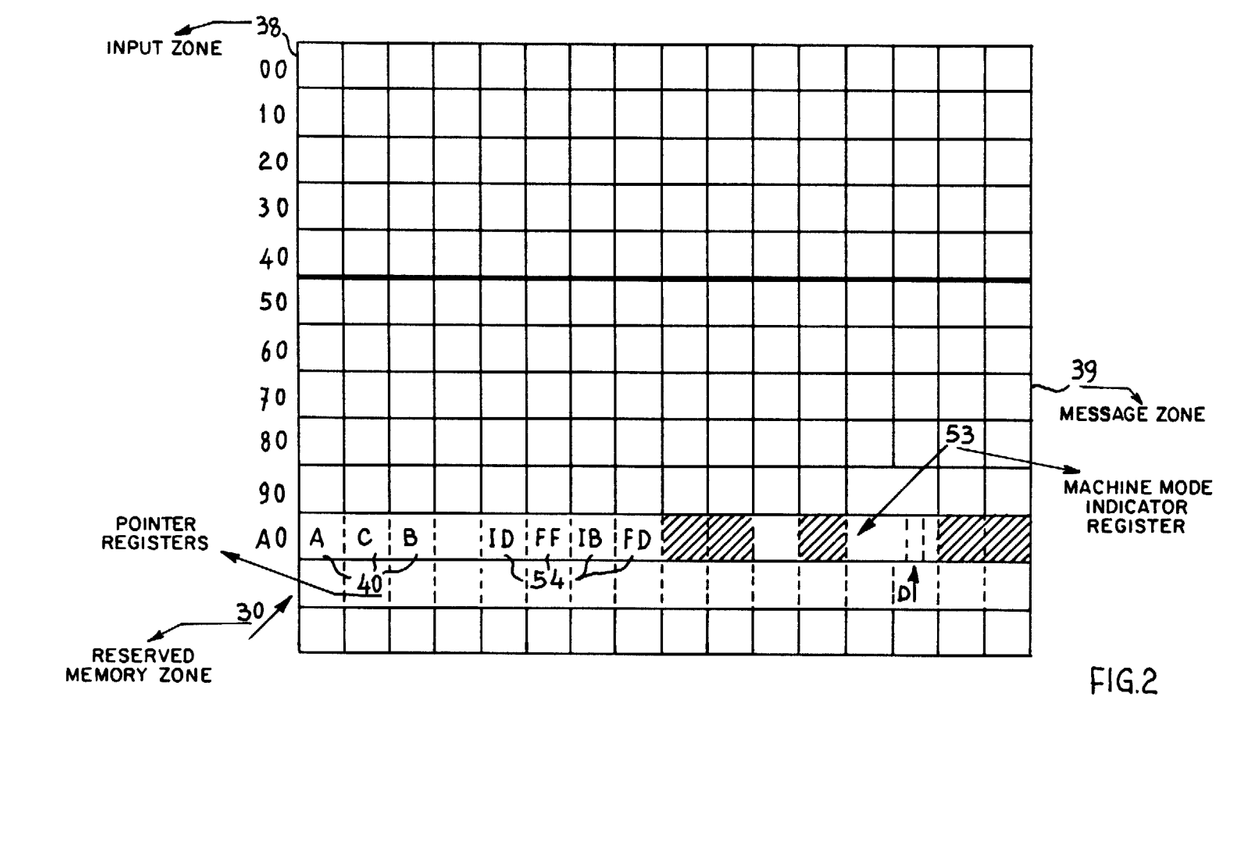
FIG. 2 is a diagram of the arrangement of a memory of the computer.

This page comprises an input zone 38 for the information entered on the keyboard, a message zone 39 for the messages of the central unit, pointer registers 40 for pointers A, B, C, and a machine mode mask indicator register 53, which elements will be explained in more detail below.

Figure 3:
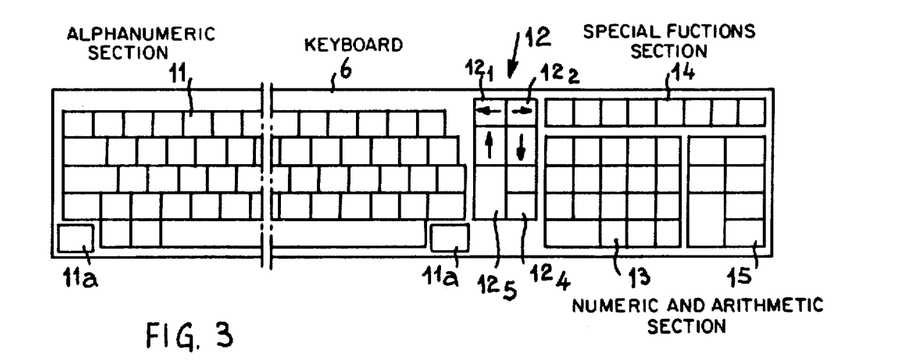
FIG. 3 is a diagram of the keyboard of the computer.

The keyboard 6 comprises an alphanumeric section 11 (FIG. 3) including a pair of shift keys 11a known per se, a section 12 provided with editing keys for correcting instructions (BASIC phrases) in the stage of introduction or of calling from the memory, a numeric and arithmetic section 13 for manual use of the computer, and a section 14 for sixteen special functions which are definable by the user and can be called by means of keys F1 to F8. A section 15 of the keyboard 6 comprises eight control commands which can be used for calling standard programs of the system, as will be seen better hereinafter.

The input zone 38 and message zone 39 can be connected to the VDU 8 (FIG. 1), which is adapted to display a line of 32 alphanumeric characters, plus an indicator between two character positions. Each character is constituted by a 7 × 5 matrix (7 lines, 5 columns) of dots 34; adjacent characters are separated from one another by two blank separating columns of dots 34. These columns can therefore be obscured.

The VDU 8 is of the type known per se having elements or dots 34 (FIG. 5), with cyclically programmed electric discharge in a gas. More particularly, the elements are disposed in 222 columns of seven elements each and are energizable selectively, each through a cathode and an anode. Each column of elements has a common cathode 33 while each row has a common anode 37. The 222 columns correspond to 32 characters with 7 columns (including 2 blank separating columns) for each character, minus the last two unnecessary blank separating columns (7 × 32 = 224 − 2 = 222).

The operation of the VDU 8 is based on the propagation of a discharge along the cathodes 33 under the control of a counter 41 (FIG. 5) according to known activation scheme (e.g., U.S. Pat. No. 3,701,924) and the selective energization of the anodes 37 in synchronism with the movement of the discharge under the control of a driving circuit, not shown in the drawings. After the discharge has reached the last cathode 33, a reset pulse must be applied afresh to the first cathode 33 to recommence the scanning. The propagation of the cathode discharge is not visible from outside at the dots 34. The discharge becomes visible at selected dots, at the instant of selective energization of the anodes 37.

Figure 5:
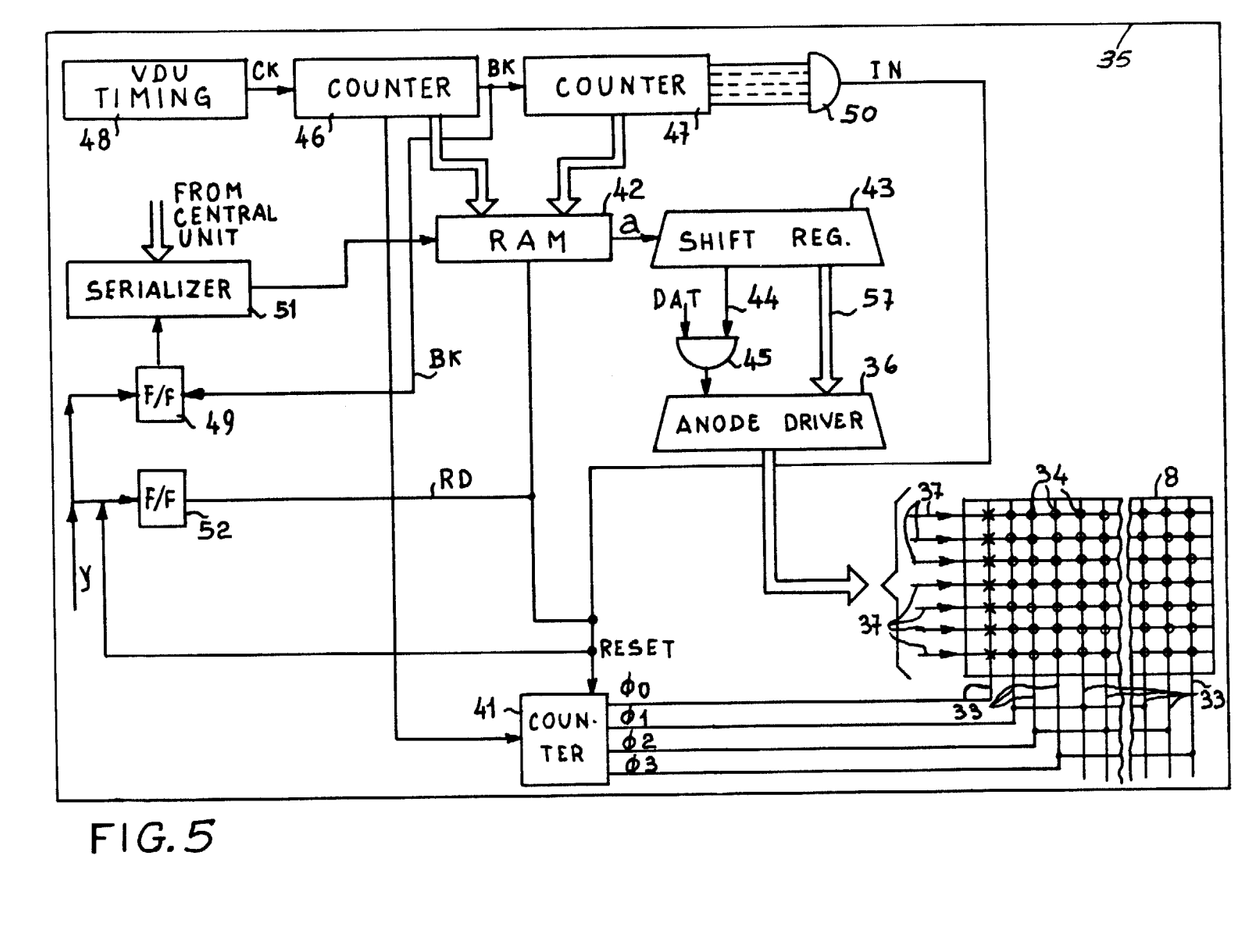
FIG. 5 is a diagram of the control unit of the visual display unit.

The driving circuit receives directly from the central unit 2, column by column, the decoded signals of the character to be visually displayed, so that the usual character generating unit is not necessary.

Control of the VDU.

The synchronism between the energization of the anodes 37 of the VDU 8 and the triggering of the discharge at the cathodes 33 is ensured by the fact that the same clock CK that times the scanning of the cathodes 33 enables the sending of characters to the anodes 37.

The VDU 8 is driven by the control unit 35 which is asynchronous with respect to the central unit 2 and allows visual display of the data even during the processing operations of the central unit 2. More particularly, the asynchronous control unit 35 comprises a RAM 42 with a capacity of 2 K bits. The RAM 42 is adapted to accommodate the enabling signals for the anodes 37 of the VDU 8 corresponding to the individual dots of the individual columns (the RAM capacity of 2 K bits corresponds to 256 eight-bit bytes). Moreover, for each character it is adapted to store a bit which constitutes a pulsating column information item (bit = 1) or a fixed column information item (bit = 0) and will be called the flash bit.

The bits of the RAM 42, extracted serially, are transferred along a connection a to a shift register 43 constituting a buffer for the VDU 8 and having parallel output to an anode driver circuit 36 so that the register 43 generates an eight bit driving signal for the VDU 8. Of these eight bits, seven bits 57 are applied directly to the circuit 36 driving the annodes 37 of the dots 34, while the eighth bit 44 is the flash bit applied to an AND gate 45 which, in response to a square-wave timing signal DAT with a frequency of 4 Hz, generates a pulsating signal for the circuit 36 every time the eighth bit 44 is one. This signal constitutes an intermittent zeroizing command for the corresponding column of the VDU. The frequency of 4 Hz being lower than that of persistence of images on the retina, this intermittent zeroizing presents an optical flashing effect to the user.

The clock signal CK is generated by a timing circuit 48 which operates independently of the timing circuit 9 (FIG. 4) of the central unit 2, so that it is clear that the control unit 35 of the VDU 8 is asynchronous with respect to the processing operations of the central unit 2. The timing circuit 48 acts on the RAM 42 through two binary counters 46 and 47 in such manner that in the time taken by the gas discharge to propagate itself from one column to another of the VDU 8 the RAM 42 transfers one byte to the buffer 43, so that the timing circuit 48 times the driving of the anodes 37 of the VDU 8. The counter 46 has four outputs and supplies by means of these outputs the address of the individual bit of the RAM 42 in the limits of a byte; the eight-output counter 47 supplies by means of its outputs the address of the individual byte in the RAM 42. Thus, the two counters 46 and 47 address a bit in the limits of a byte of the RAM 42. The counter 47 is incremented by one every time the capacity of the counter 46 is exceeded, by a signal BK derived from the output of highest weight of the counter 46. The counter 46 is incremented by one by the clock signal CK from the timing circuit 48.

Since the eight outputs of the counter 47 represent up to 256 possible configurations, in order to signal the 222nd configuration it is necessary to obtain a signal which is the logical sum of all the outputs except the fifth and the eighth, which sum constitutes precisely the value 222. To this end, the aforesaid outputs of the counter 47 are applied to an AND gate 50 which provides an output signal IN equal to 1 only when all the inputs are 1. This signal IN is applied to the reset terminal of the counter 41. Since each character occupies seven columns of the visual display and there are 222 columns in the visual display, the 32nd character is devoid of the two space columns to its right.

The two addressing counters 46 and 47 act on the RAM 42 both when writing in the information coming from the central unit 2 and when reading out the information in the VDU 8. A flip-flop 52, set by the signal Y of the logic 12 and reset by the signal IN of the AND 50, distinguishes the two stages by a signal RD applied to a read/write selection input of the RAM 42. If RD is 1, the RAM is write-enabled. The same signal RD is also applied to the reset terminal of the counter 41, so that when RD is 1, that is when it is necessary to write in the RAM 42, the counter 41 is held zeroized throughout the time of writing, whereby the VDU 8 is not enabled during writing in the RAM 42. In this stage, at the end of the writing of a byte, the bit counter 46 is zeroized and the carry signal BK which is applied to the counter 47 is also applied to the reset input of a flip-flop 49. This then, set again by the signal Y, enables a serializer 51, which causes the writing in series in the RAM 42 of a fresh byte sent in parallel by the central unit 2.

If, on the other hand, the signal RD is equal to 0, that is if the RAM 42 is read-enabled, the signal RD allows the counter 41 to count for enabling in succession the cathodes 33 of the VDU 8, which thus displays the characters read from the RAM 42.

As has already been seen, the two zones 38 and 39 (FIG. 2) are intended for receiving the information sent from the keyboard 6 and by the programs in course of processing in the central unit 2, respectively. The information sent from the keyboard 6 may be either instructions in BASIC language with a maximum length of 80 characters, or commands, or data to be processed. On the other hand, the information sent by a program in course of processing may be either error messages, or a request for data to the operator, or instructions executed in a debugging mode. In this case also, therefore, the maximum length of the information is 80 characters.

So far as the keyboard is concerned, the VDU 8 is used as a window in which appears a partial string of the 80 characters present in the input zone 38. To this end, the three pointers A, B, C of the group 40, each with a capacity of one byte, can represent numbers up to 256. The pointer A is used to indicate the beginning of a string of characters which is displayed on the VDU 8; the pointer B is used to indicate the character position in the string which it is desired to modify, and the third pointer C is used to indicate the end of the string. The capacity of one byte for each of the pointers is sufficient to express the 80 character positions of the input zone 38 of the keyboard 6.

To this end, therefore, the two zones 38 and 39 have a length of precisely 80 bytes and can be connected alternately as output to the VDU 8 through the RAM 42. Since the capacity of the VDU 8 is equal to 32 characters, of the 80 characters possibly present in one of the two zones 38 and 39 not more than 32 can be displayed at the same time.

More particularly, to load a character into the VDU 8, the central unit 2 first makes a test 120a (FIG. 6) of a switching element D to identify which buffer 38 or 39 is connected to the VDU 8. The switching element D is set on the entry of a datum on the keyboard, as will be seen better hereinafter.

Figure 6:
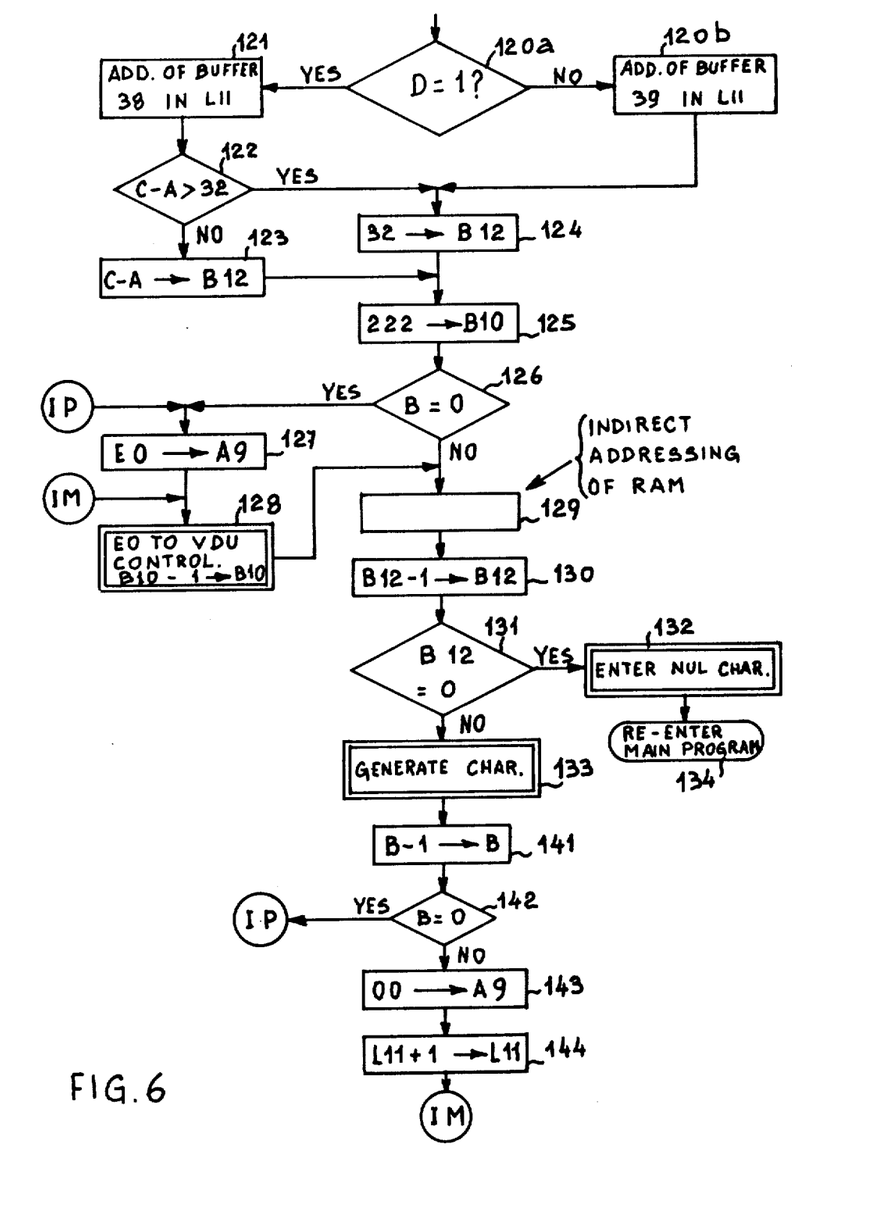
FIG. 6 is a flow diagram relating to the driving of the visual display unit.

If D = 0, a routine which enters an address within the message zone 39 in the register L11 of the memory 10 is executed (operation 120b). This address identifies the first character in the message zone 39 which is to be displayed. Conversely, if D = 1 the operation 121 of entry of a character address within the input zone 38 in the register L11 is executed. After the operation 121, a test 122 is carried out to determine the number of characters to be displayed. To this end, the beginning of string pointer A addressed by the register L2 is transferred to the register B9 (see FIG. 4) and the end of string pointer C addressed by the register L3 is transferred to the register A9. The difference between the two registers A9 and B9 is then calculated and the result is put into the register A9. The value 32 is then entered in the register B9 and is substracted from the register A9, putting a switching element to 1 if a carry occurs (that is, if C - A is not greater than 32). This switching element is now tested and if it is found at zero a jump is made to the operation 124 of entering the number 32 as the number characters to be visually displayed in the register B12. If, on the other hand, the switching element is found at 1 (that is, in the case of C - A not being greater than 32), an operation 123 is executed, which enters in the register B12 the difference between C and A already contained in the register A9, representing the number of characters to be displayed.

In both cases there is now carried out an operation 125 which provides for loading into the register B10 the number 222 of bytes corresponding to the columns of the VDU 8. At this point an operation 126 of testing of the modifying position pointer B is effected, the value of B being transferred to the register A14. If B = 0, a jump is made to a routine which comprises an operation 127 and a subroutine 128. The operation 127 enters a character code E0 in the register A9. The subroutine 128 provides for sending the code contained in the register A9 to the control unit 35 (FIG. 5) of the VDU 8, decrementing the register B10 containing the total number of columns to be sent. The code causes a marker to be displayed at the character position identified by pointer B. An unconditional jump is then made to operation 129, at which the program arrives in the event of the test 126 giving a negative result.

Operation 129 provides for extracting the character to be visually displayed and addressed by the register L11. The RAM 4 is addressed by this character in a character generating zone. This zone comprises 640 bytes divided into five parts of 128 bytes each corresponding respectively to the first 128, the second 128, the third 128, the fourth 128 and the fifth 128 columns of the 128 characters of the ISO code which can be visually displayed. To obtain the five columns of a given character, the byte of the first series of 128 bytes which corresponds to the first column of the character is addressed by the same code of the character. Then, the first column having been sent, the byte distant from the first by 128 positions is addressed and is likewise sent, and so on. Therefore, the computer does not require a special unit for generating the character to be visually displayed. The bytes are sent to the RAM 42 via the serializer 51 (FIG. 5) and as each byte is sent, the register B10 is decremented.

An operation 130 is now carried out, which decrements the register B12 containing the number of characters to be visually displayed. There now follows a test 131 to check whether the number of characters to be visually displayed in zero. If B12 = 0, a jump is made to a routine 132 which enters NUL (space) characters until the RAM 42 is full, in the event of the number of characters to be visually displayed being less than 32, after which a jump 134 is made to the address of re-entry into the main program, inasmuch as the VDU 8 has been fully supplied.

If, on the other hand, the test 131 gives a negative result, the next character addressed by the register L11 has to be sent. There is first carried out a character generating routine 133 which effects the reading of the character from the RAM 4 and sends the columns of the character to the VDU 8 in succession.

At the end of the routine of sending of five columns of the character, a decrementing operation 141 is executed on the register A14 for decrementing the pointer B. On the occurrence of the condition B = 0, tested by the operation 142, a signal IP causes the operations 127-142 to recycle to send the character marker code EO and the following characters.

Conversely, in the case of B being different from zero, the operation 143 of entry in the register A9 of the space zeros between two characters is executed. Thereafter, an operation 144 of incrementing the register L11 to provide the address of the next character to be visually displayed is carried out. Finally, a signal IM of re-entry to the routine 128 is generated, so that by the operation 129 access is obtained repeatedly to the successive characters of the input zone 38 or message zone 39 until the test 131 indicates that the characters to be visually displayed have been exhausted.

Control of VDU by the keyboard.

At the instant of switching-on of the machine, there is introduced into the RAM 4 from the disc unit 5 (FIG. 1) a handling program α for the keyboard 6, which also provides for initializing the memory registers and the machine mode conditions. Such a program is conventional in the microprogrammed computer art, consequently, it is not necessary to explain the detailed operation thereof. Then, the pointers A, B, C of the group 40 (FIG. 2) are zeroized, thus indicating by their contents the first character position 00 of the input zone 38. Normally, a switching element D of the page 30 is at zero (FIGS. 2 and 7) and the input zone 38 is connected to the VDU 8, as indicated diagrammatically by gate 38a in FIG. 7. Since the pointer B is zeroized, the marker character appears in the first character on the left of the visual display 8, in the form of four luminous dots in the first two columns of that character. These luminous dots are rendered flashing by the eighth bit 44 (FIG. 5) of the column byte, which is then equal to one.

The introduction of each alphanumeric character from the keyboard 6 causes the insertion of its code by the program α in the position in the input zone 38 (FIG. 2) to the right of the position corresponding to that of the visual indicator (marker character) on the VDU 8, as well as the incrementing of the point B by one. The position of the visual indicator will be determined in the input zone 38 on the basis of the current contents of the pointer B and this visual indicator will therefore always occupy in the VDU 8 the two columns to the left of the last character visually displayed. The pointer C is also incremented by one at each character entered on the keyboard 6. Both the pointer B and the pointer C can reach by successive increments the maximum value of 80, equal to the maximum number of characters of an instruction in BASIC language.

On the other hand, the pointer A, which defines the beginning of the string of 80 characters of the input zone 38 is not incremented up to the entry of the 31st character on the keyboard 6, but is incremented by one at each character following the 31st struck on the keyboard 6. The beginning of the string of the data visually displayed shifts, the first column of the VDU 8 corresponding to the value of A. In this way, the last 32 characters introduced from the keyboard 6 are visually displayed, that is all those comprised between positions A and A + 31. The effect visible to the user on the VDU 8 is a slipping of the entire window to the left.

On the actuation of a key of the keyboard 6, the program α first causes the recognition of the code of the actuated key through the agency of the central unit 2. Then the program α sends the key code to the register A11 of the memory 10 (FIG. 4) and calls the "Alphanumeric input" subprogram. By an operation 60 (FIG. 8), this subprogram resets to 0 the switching element D of the register 53 (FIG. 2), if D should be in the 1 state.

Figure 8:
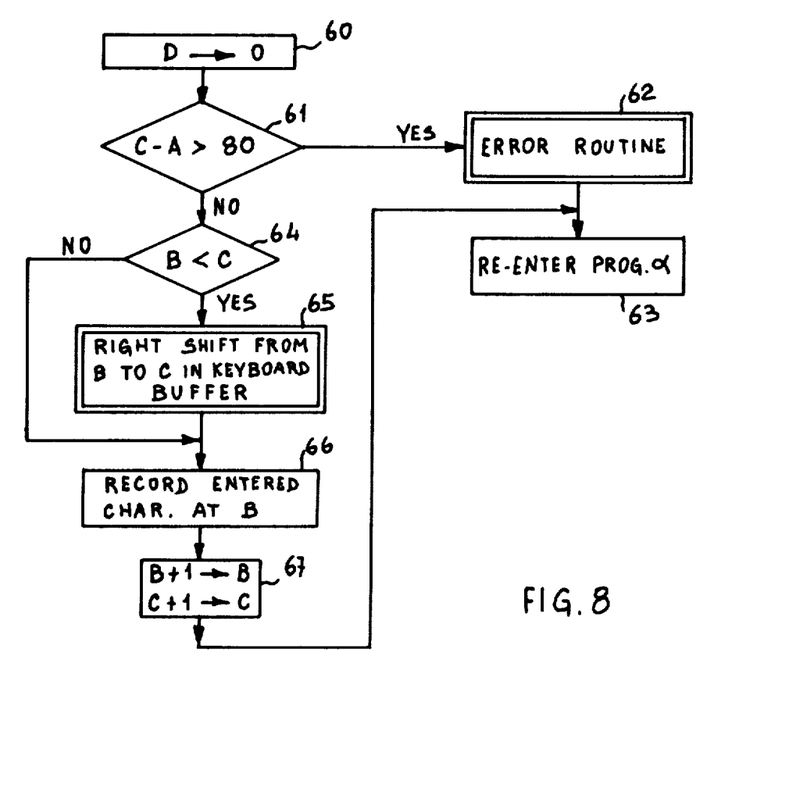
FIG. 8 is a flow diagram of the alphaneumeric input subprogram.

The operation 60 is followed by a test 61 to check whether the difference between the contents of the pointers C and A exceeds 80. On the entry of the first character, both C and A are at zero. If the result of the test 61 is positive, a jump is made to a routine 62 signalling an error because the capacity of the input zone 38 is being exceeded. After this routine, a jump 63 is made to the address of re-entry to the program α by an unconditional jump microinstruction.

On the other hand, in the event of the test 61 giving a negative result, a test 64 is made to check whether the value of the pointer B is less than the value of the pointer C. This is effected by means of a transfer of the contents of the pointer C to the register A10 of the memory 10 (FIG. 4), a transfer of the contents of the pointer B to the register B10 of the memory 10, forming the difference between the registers A10 and B10 with the result in A10 and the positioning of a switching element if the value C proves higher than that of B. This latter case occurs when the character entered on the keyboard must be inserted in the string already loaded in memory, as will be seen hereinafter. To this end, a microinstruction tests this switching element and, finding it at 1, effects a jump to the routine 65 (FIG. 8) of shifting to the right in the input zone 38 of all the characters between the pointer B and the pointer C with the aid of the two addressing registers A2 and A8 decremented in succession and the extraction from a RAM location and the deposit in the adjacent RAM location, respectively, of each character between the pointers C and B.

After this, an operation 66 of recording of the character entered on the keyboard in the input zone 38 in the position indicated by the pointer B can be executed. This operation 66 is also executed directly in the event of the test 64 giving a negative result. In fact, in this case, the values of B and C coincide and the character entered on the keyboard does not have to be inserted but added to the string already loaded into the input zone 38. B and C are then incremented (operation 67) and re-entry from the "Alphanumeric input" subprogram to the program α takes place by means of the microinstruction containing the re-entry address (operation 63).

If, after loading a number n of characters into the input zone 38, the user wishes to insert one or more characters at positions starting from position m, with $0 < m < n$, he actuates in the section 12 of the keyboard 6 (FIG. 3) the key $12_1$ for back-spacing by one step, a number of times equal to n − m. With each actuation, the pointer B is decremented by one. Correspondingly, the visual indicator shifts step by step to the left, if A = 0, and this shifting can continue until the occurrence of B = 0. If, on the other hand, A > 0, the visual indicator does not shift, while both the pointers A and B are decremented by one until A = 0. If A > 0, the visual indicator always appears in the first position of the VDU 8 and the characters between the preceding value of A and A + 31 are shifted step by step to the right in the VDU 8. When A = 0, operation continues as in the preceding case. In either case, the pointer C is not modified and remains to indicate the number of characters introduced into the input zone 38.

More particularly, on the actuation of the key $12_1$, an operation 82 (FIG. 9) is effected which tests the switching element D of the register 53 (FIG. 2) for the purpose of identifying which zone, the input zone 38 or the message zone 39, is connected to the VDU 8. If this switching element D is at 0 (that is, the zone connected to the display 8 is the input zone 38), the execution of an operation 83 of comparison between the pointers A and B of the input zone 38 is produced. If A = B, a switching element of the memory 10 is actuated and causes a re-entry jump 134 to the program a.

Figure 9:
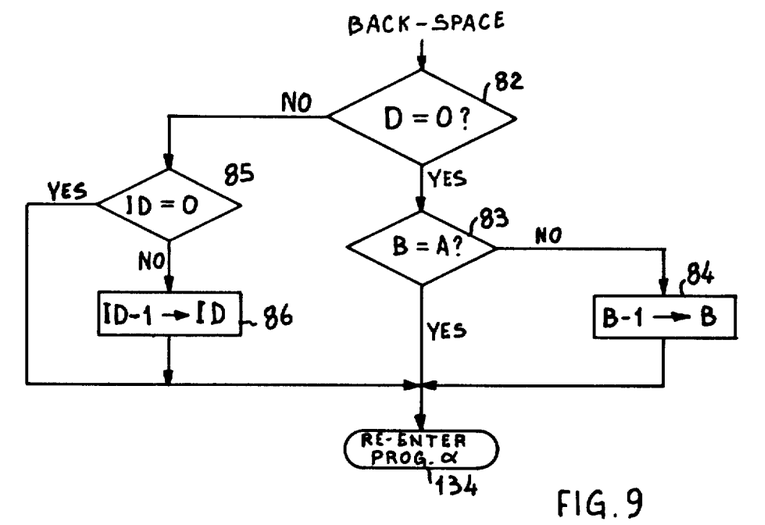
FIGS. 9 to 12 are flow diagrams of the control of a visually displayed line of characters.

On the other hand, if A ≠ B, this means that the pointer B is still greater than the pointer A, so that the testing of this switching element produces an operation 84 of decrementing of the pointer B followed by re-entry 134 to the program a.

In the condition in which the pointer B is less than the pointer C, a possible keying operation in the section 11 of the keyboard 6 produces in known manner a shift of the entire contents of the input zone 38 by one position to the right, between the positions indicated by the pointers B and C. Moreover, the keying in the section 11 causes insertion in the input zone 38 and therefore in the displayed string of the respective characters, effecting the incrementing of the pointers B and C by one.

If, on the other hand, it is desired to change or correct a character, the visual indicator is first brought immediately to the right of the character to be changed by actuation of the key $12_1$ (FIG. 3) as in the preceding case. A character erasing key $12_3$ of the keyboard 6 is then actuated. The erasure of the character to the left of the position indicated by the pointer B, the shifting to the left by one step of the contents of the input zone 38 (FIG. 2) between the positions indicated by the pointers and the decrementing of the pointers B and C by one is then produced. At this point, the character which it is desired to substitute for that erased is struck in the section 11 of the keyboard, so that the operations described for the case of insertion are repeated.

The desired changes in a string having been made, it is possible to return to the position indicated by the pointer C to terminate the entry of the string. To this end, a key $12_2$ (FIG. 3) for advancing the pointer B is actuated repeatedly.

On actuation of the key $12_2$, the central unit executes the test 82 (FIG. 10) to see if D = 0. If the test gives a positive result, the machine proceeds to the operation 101 of comparison between the pointers B and C. If B and C are equal, a switching element of the memory 10 (FIG. 4) which controls the re-entry 134 to the program a is actuated. If, on the other hand, B and C are unequal, the switching element is not actuated and controls an operation 102 (FIG. 10) of incrementing of the pointer B.

It is therefore clear that the incrementing of the pointer B by one may continue until the moment when the contents of the pointer B become equal to those of the pointer C. After this, each further actuation of the key $12_2$ no longer has any effect on the pointer. Therefore, until the contents of B are equal to the contents of C, the visual indicator of the VDU 8 is shifted to the right by as many positions as there are actuations of the key $12_2$, until the condition B = C occurs.

Moreover, as long as the condition B + 1 < 32 occurs, the pointer A is not affected. In the opposite case, that is if B + 1 ≧ 32, the pointer A is also incremented by one and the visual indicator now stops in the last position of the display 8, while the first 31 positions, comprised between the positions indicated by the pointers A and B, are shifted to the left by one position on the VDU 8.

Figure 12:
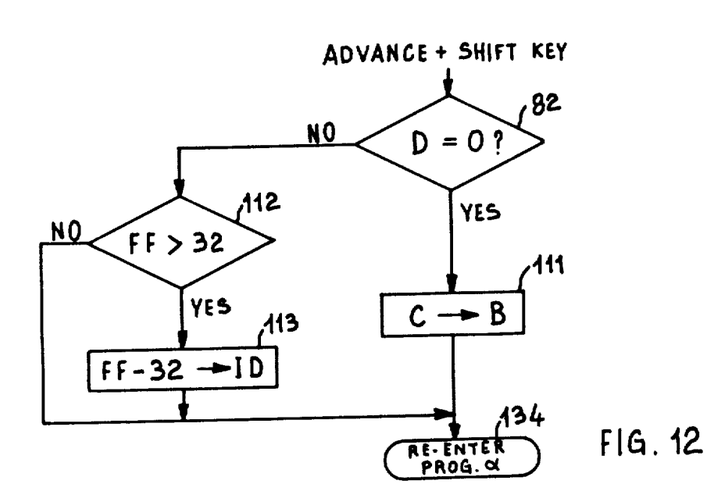

If the back spacer $12_1$ or the advancing key $12_2$ is actuated simultaneously with the shift key 11a, the respective codes command routines for the execution of operations different from those seen before. More particularly, the advancing key $12_2$ now commands the pointer B to copy the pointer C. In particular, on sumultaneous actuation of the keys $12_2$ and 11a, the operation 82 (FIG. 12) of testing of the switching element D to identify the zone connected to the VDU 8 is effected. If the input zone 38 is connected to the VDU 8, the operation 111 of copying the pointer C in the pointer B is executed by transferring the value of C to the register A9 (FIG. 4) and the contents of the register A9 to B, so that B is made equal to the string end value. If the string contains less than 32 characters, the visual indicator jumps into correspondence with the last character of the string. If the string is equal to or longer than 32 characters, the visual indicator positions itself to the right of the character in position 31 of the VDU 8.

Figure 11:
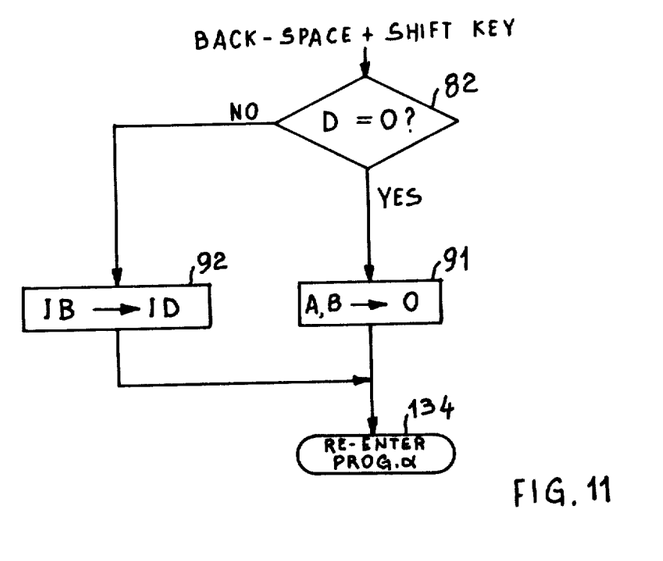

Finally, by depressing the key $12_1$ together with the key 11a the two pointers A and B are zeroized, so that on the one hand the string shifts to the right until the first character in the input zone 38 is displayed, while the visual indicator is brought into correspondence with this character. Thus, on simultaneous actuation of the keys $12_1$ and 11a, the operation 82 (FIG. 11) for identifying the buffer connected to the VDU 8 is effected. If the test finds the switching element D at zero, an operation 91 consisting in zeroizing the pointers A and B is executed. This is effected by transferring the contents of the pointers A and B to the registers A10 and A9, respectively, of the memory 10 (FIG. 4), by zeroizing these registers and by retransferring the contents thereof to the pointers A and B.

Figure 7:
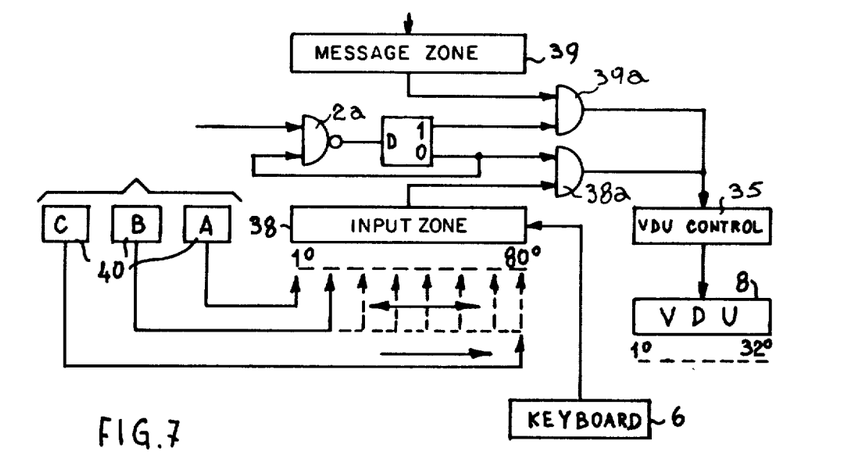
FIG. 7 is a diagram illustrating the use of the visual display unit in the computer.

The action of the pointers A, B and C on the keyboard input zone 38 and, therefore, on the VDU 8 is indicated diagrammatically in FIG. 7.

Control of the central unit on the visual display.

The operations commanded on the VDU 8 through the agency of the alphanumeric keyboard and the keys $12_1$, $12_2$ and 11a are effected under the control of the various components of the central unit 2 and require in particular the use of the memory 10. This does not prevent the central unit 2 being able to carry out simultaneously other programs which do not interfere with the program a and the corresponding routines seen before and do not require the use of the same components. More particularly, as seen hereinbefore, the registers 38, 40 and 53 of the page 30 (FIG. 2) are reserved for introduction from the keyboard 6. Moreover, these operations may be effected during the processing operations of the central unit 2, due to the asynchronous control unit 35 (FIG. 5) of the VDU 8.

The message zone 39 (FIG. 2) may be connected to the RAM 42 instead of the input zone 38 and, as already seen, receives error messages from the programs in course of execution or programmed guide communications to the operator. For the information in the message zone 39 there is a group of registers 54 in the page 30 of the RAM 4 (FIG. 2), this group comprising a beginning-of-buffer pointer register IB and a beginning-of-string pointer counter ID which indicates by its contents the position of the message zone 39 from which the message or instruction is displayed.

As has been said, the message zone 39 serves for the programs in course of processing. When the program processed by the central unit 2 requires intervention by the user, this request must be displayed on the VDU 8, while the processing stops. Before sending the message to the message zone 39, the central unit 2 provides for setting the switching element D (FIG. 2) of the register 53 at one, thus reserving the VDU 8 for the message zone 39 (FIG. 7) via a gate 39a. Since the connection of the buffer 39 to the VDU 8 takes place in the stage of execution of programs, that is not in the editing stage, any intervention for correction is prohibited. Therefore, for the message zone 39, the visual indicator is not provided in correspondence with the pointer ID on the VDU 8. Each actuation of the key $12_1$ or $12_2$ only produces the decrementing or the incrementing, respectively, of the pointer ID for the purpose of shifting the VDU window relative to the message zone 39.

As has been seen hereinbefore, the sending of the information in the message zone 39 to the VDU 8 now takes place starting from the position indicated by the pointer ID as far as the position ID + 31. To this end, the group of registers 54 comprises a pointer counter FD (FIG. 2) backing the pointer ID. The pointer FD is incremented by one from each fixed value of ID up to the value ID + 31. If ID > 0, at each actuation of the key $12_1 \leftarrow$ FIG. 3), while the pointer is decremented by one, the displayed line is shifted to the left with respect to the string of the message zone 39.

Thus, if the test 82 (FIG. 9) of the switching element D gives a negative result, on depression of the key $12_1$, the machine then proceeds to a fresh test 85 to check whether the pointer ID of the message zone 39 is at zero. If the result of this test is positive, a jump is made to the address of re-entry to the program $\alpha$ (operation 134). In the negative case, on the other hand, at each depression of the key $12_1$ the operation 86 of decrementing of the pointer ID is executed until this returns to zero, after which an unconditional jump is made to the address IR of re-entry to the program $\alpha$, so that the displayed line is shifted to the left.

Another register of the group 54 (FIG. 2), called FF, is provided for the purpose of designating the last message position sent to the message zone 39 by the central unit 2. Normally, by depressing the key $12_2$, the pointer ID is now incremented. When the sum ID + 32 is equal to FF, however, any shifting of the displayed line to the right is no longer possible, so that the action of the key $12_2$ is not executed. On the other hand, when this condition is reached, there is no sense in continuing to shift the message which terminates at the position FF, since only spaces would appear on the visual display. Thus, if the test 82 (FIG. 10) gives a negative result and the key $12_2$ is depressed, a further comparison 103 is carried out between the pointers ID and FF. If the comparison gives a result of inequality, a further comparison 104 is effected to check whether the last 32 characters in the message zone 39 are not already all displayed. To this end, the comparison ID + 32 > FF is made by entering the value 32 in the register A11 and the contents of the register A9 in the register B11 and adding the contents of the registers A11 and B11, that is 32 to the pointer ID, with the result in the register A11. The difference between FF and ID + 32 is then obtained, a switching element being positioned at one if a carry is generated. Finally, testing of this switching element is effected and, if it is found at zero (negative result of the comparison), an operation 105 of incrementing of the pointer ID by one is produced.

Figure 10:
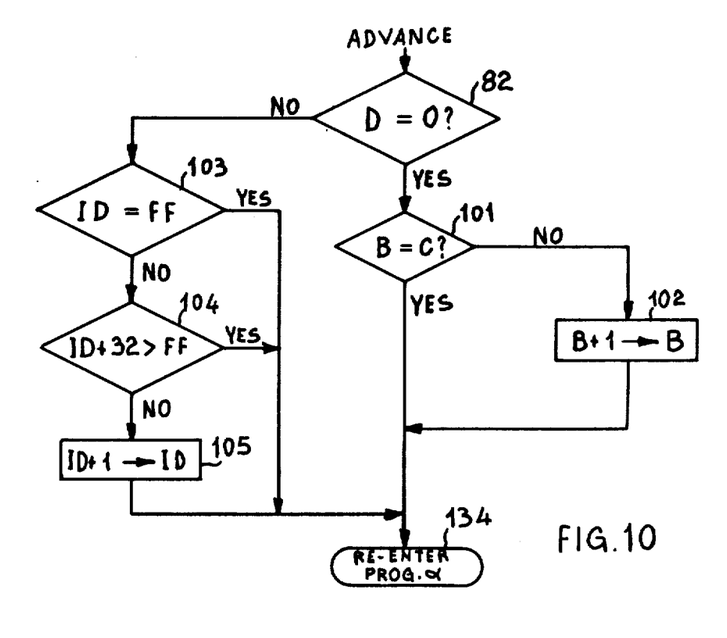

If, on the other hand, the comparison 104 gives a positive result, that is if the last 32 characters in the message zone 39 are already visually displayed, so that it is not necessary to increment the pointer ID further, a jump is made to the address of re-entry to the program $\alpha$ (operation 134). The same jump microinstruction is executed for a positive result of operation 103.

The use of the key $12_1$ (FIG. 3) simultaneously with the key 11a when the test 82 (FIG. 11) of the switching element D gives a negative result causes the forcing of the value contained in the pointer IB into the pointer ID by an operation 92 which consists in duplicating the contents of the pointer IB in the pointer ID of the message zone 39. This takes place by entering the initial address of the message zone 39 in the register A9 and transferring the contents of the register A9 to the pointer ID, so that the initial part of the string of the message zone 39 is immediately displayed. This operation is followed by the unconditional jump 134 to the address of re-entry into the program $\alpha$. On the other hand, the use of the key $12_2$ (FIG. 3) simultaneously with the key 11a when the test 82 (FIG. 12) gives a negative result causes a comparison 112 between the string end pointer FF and 32. In the event of a negative result, that is if all the characters of the string are already displayed, a jump is made to the program $\alpha$ (operation 134). The comparison 112 is performed by transferring the contents of the pointer FF to the register A9 and loading the value 32 into the register B9. The difference between the registers B9 and A9 is then found and a switching element is positioned at one in the event of a carry occurring. This switching element is tested and, if found at zero (positive result for FF greater than 32), operation 113 is produced, which consists in entering in the pointer ID the difference present in the register A9 and calculated before, so that the final righthand portion of the string of the message zone 39 is visually displayed. After this, a jump 134 of re-entry to the program $\alpha$ is made. The same jump is performed in the event of a negative result of the test 112 (for FF not greater than 32).

Alternate control of the visual display by the keyboard and the central unit.

The computer comprises in the section 12 of the keyboard 6 a key $12_4$ (FIG. 3) which is adapted to condition the central unit 2, by successive actuations, to connect the two zones 38 and 39 alternately to the VDU 8. More particularly, the key $12_4$ is adapted to change over the state of the switching element D each time it is depressed, and therefore the connection of the central unit 2 from one of the two zones to the other, so that in one case the user can suspend a request for the VDU made by the central unit 2 and, in the other, after an entry made on the keyboard, can call to the VDU 8 the request made by the central unit 2. When the key $12_4$ is actuated to bring the switching element D to 0 and call the input zone 38, it also allows superposition in time to be obtained between the operations of introduction on the keyboard 6 and the processing operations of the central unit 2 suspended by the stopping of the program.

The use of this key $12_4$ proves of great utility to the operator in the loading of instructions which are wrong in form into the machine and in introducing the data requested by a program in course of processing.

In the first situation, an inaccuracy of form encountered in the instruction loaded from the keyboard 6 into the input zone 38 causes the sending of a message to the message zone 39 by the keyboard handling program and the changing over of the switching element D to 1, so that the VDU 8 is then connected to the message zone 39 and displays the contents thereof. At this point, by actuating the key $12_4$, the operator can switch the connection to the VDU 8 from the message zone 39 to the input zone 38 to display the erroneous instruction again.

This is achieved by feeding back the current value of the switching element D of the page 30 of the RAM 4 (FIG. 2) to the NAND gate $2a$ (FIG. 7) which provides an exclusive-OR function with a bit of a suitable microinstruction generated at each actuation of the key $12_4$, so that there occurs each time the change-over of the switching element D from 0 to 1 and from 1 to 0.

In response to the actuation of the key $12_4$ there is effected an operation 115 (FIG. 13) of changing over of the switching element D by producing an exclusive-OR between the contents of the switching element D and the bit due to the depression of the key $12_4$. The switching element D is thus changed over from 0 to 1 and from 1 to 0 according to its initial state. Testing 116 of the machine state stored in the RAM 4 then takes place to establish whether the changing-over of the switching element D has been effected by the central unit 2 or not. In general, to each change-over effected by the central unit 2 there corresponds a message which the central unit 2 sends to the message zone 39. The user can now either enter the datum required by the message or ignore the message and change the connection of the VDU 8 over again from the message zone 39 to the input zone 38 to terminate the keying operation which he had in progress. Therefore, if the result of the test is negative, re-entry into the main program occurs directly. On the other hand, if the result is positive, an operation 117 of zeroizing of the machine state which has caused the connection of the message zone 39 of the VDU 8 is effected.

Figure 13:
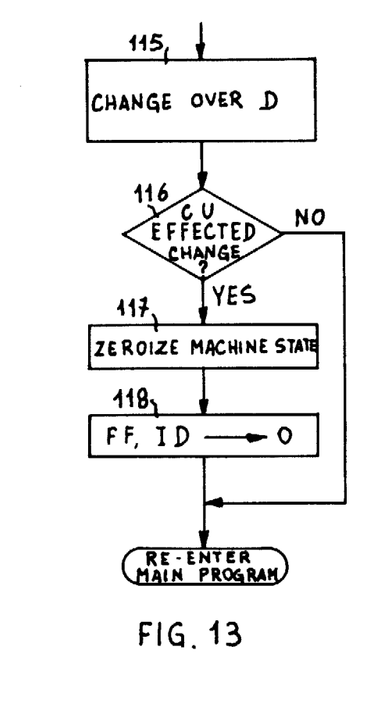
FIG. 13 is a flow diagram of the operations of a control key of the visual display unit.

The operation 117 is followed by an operation 118 which zeroizes the pointers FF and ID inasmuch as the user must look at the message of the central unit 2 starting from the beginning thereof. By acting on the keys $12_1$, $12_2$, the user can then command the shifting of the pointers and display the remaining part of the message. The operation 118 is followed by re-entry into the main program at the point at which the switching element D is tested, as seen hereinbefore, for connecting the message zone 39 to the VDU 8. The operator thus has the possibility of preserving both pieces of information, that of the message and that entered.

By actuating the key $12_4$ again, the operator can alternately re-examine the signalling of the program and the datum or the instruction prepared in the message zone 39 to check exhaustively the compatibility of the entered datum with the request of the central unit 2. When this compatibility is verified, the operator actuates an end-of-line key $12_5$ (FIG. 3) to indicate that the introduction of the datum is terminated and that the datum itself is at the disposal of the program.

What we claim is:

1. In a programmable electronic computer comprising a working memory, a central unit performing a processing operation in executing programs recorded in the working memory, a first timing circuit for timing said processing operation of the central unit in execution of said programs, a keyboard comprising control keys and character keys for introducing keyboard information to be processed into an input zone of said working memory, a visual display unit for displaying a message sent by the central unit to a message zone of the working memory, and a display control unit for controling said visual display unit comprising:

a supply memory controlled by said central unit to supply said message or said keyboard information to the visual display unit; and, a second timing circuit for timing said display control unit and said supply memory independent of the timing of said central unit by said first timing circuit;

said electronic computer further comprising:

signalling means in the central unit for signalling the presence in said message zone of a message sent by the central unit to be displayed;

switching means conditionable for selectively connecting the supply memory to said input zone or to said message zone of the working memory; and manual means being operable to condition said switching means, whereby said visual display unit can selectively display said message or said keyboard information during said processing operation of the central unit.

2. A computer according to claim 1, wherein said manual means is a single key further included on the keyboard for conditioning said switching means by successive actuations to alternately connect the input zone and said message zone of the working memory to the supply memory.

3. A computer according to claim 1, wherein the visual display unit is provided for displaying a line of characters at a time under the control of the supply memory, the input zone and said message zone recording the codes of a number of characters greater than that of the supply memory, and comprising addressing means in the working memory for addressing the character locations in said input zone and in said message zone to be visually displayed.

4. A computer according to claim 3, wherein said manual means in a single key further included on the keyboard for conditioning said switching means by successive actuations to alternately connect the input zone and said message zone of the working memory to the supply memory, wherein said addressing means comprises two addressers addressing said input zone and said message zone and are selected by said single key, command means being provided for incrementing and decrementing, respectively, the addresser associated with the zone currently selected by said single key.

5. A computer according to claim 4, wherein each of said two addressers is conditioned by the actuation of one of the control keys on the keyboard to command the central unit to send to the visual display unit a signal identifying the position of the character keys struck on the keyboard for generating one or more series of intermittant luminous dots between two characters displayed on said visual display unit.

6. A computer according to claim 5, wherein the command means are further provided for entering in said addressers a minimum value and a maximum value, respectively, contained in said addressers themselves in order to display visually an initial part and a final part, respectively, of in said selected zone, and comprise at least one control key which can be actuated to modify the contents of the addressers so as to indicate on the visual display unit a predetermined position of said identifying signal.

7. A computer according to claim 6, wherein each key on said keyboard is associated with a relevant code, comprising an additional key on said keyboard for varying said codes, and said command means actuated simultaneously with said additional key to vary said minimum value and said maximum value in a predetermined manner.

* * * * *